United States Patent [19]
Slavin et al.

[11] 3,754,796
[45] Aug. 28, 1973

[54] HYDRAULIC PRESSURE MODULATOR FOR USE IN ADAPTIVE BRAKING SYSTEMS

[75] Inventors: Michael Slavin; Ralph W. Carp, both of Baltimore, Md.

[73] Assignee: The Bendix Corporation, Southfield, Mich.

[22] Filed: Aug. 19, 1971

[21] Appl. No.: 173,268

Related U.S. Application Data

[62] Division of Ser. No. 867,840, Oct. 20, 1969, Pat. No. 3,669,403, which is a division of Ser. No. 712,672, March 13, 1968, Pat. No. 3,494,671.

[52] U.S. Cl. ............................... 303/21 F, 303/6 C
[51] Int. Cl. ............................................. B60t 8/12
[58] Field of Search ............................ 91/443, 459; 188/181; 137/487.5; 251/30; 303/6 C, 21 F, 61

[56] References Cited
UNITED STATES PATENTS

| | | | |
|---|---|---|---|
| 3,486,800 | 12/1969 | Ayers, Jr. | 303/21 F |
| 3,495,882 | 2/1970 | Stelzer | 303/21 F |
| 3,515,440 | 6/1970 | Every et al. | 303/21 F |
| 3,414,336 | 12/1968 | Atkin et al. | 303/21 F |
| 3,576,350 | 4/1971 | Larsen | 303/21 F |

*Primary Examiner*—Milton Buchler
*Assistant Examiner*—Stephen G. Kunin
*Attorney*—Bruce L. Lamb and William G. Christoforo

[57] ABSTRACT

A vacuum actuated hydraulic pressure modulator for use in an adaptive braking system for automobiles, trucks and the like, which is interposed in the vehicle hydraulic brake line between the master cylinder and the wheel cylinders to be controlled in response to error signals generated in an adaptive braking system control channel includes a diaphragm and a cooperating displacement rod within the modulator body which are positioned in accordance with the volumetric rate of air admitted to one side of the diaphragm by a solenoid valve which opens in response to an error signal generated by the adaptive braking system control channel when the vehicle wheels attain a certain dynamic condition. The displacement rod cooperates with a ball valve to normally allow free communication between the master cylinder and wheel cylinder; however, when the air is admitted through the solenoid valve in response to the error signal the displacement rod is displaced so as to isolate the wheel cylinders from the master cylinder and additionally to rapidly attenuate the hydraulic pressure at the wheel cylinders. In response to the decreasing brake pressure at the wheel cylinders, the wheel begins to accelerate to its vehicle speed. At another dynamic wheel condition, the error signal is extinguished thereby closing the solenoid valve. The modulated diaphragm and displacement rod are now repositioned so as to slowly increase the braking pressure, the rate of pressure increase being determined by the amount of air leakage across the modulator diaphragm. If wheel acceleration, in spite of the increasing brake pressure, increases to a third reference level, a modulator bypass valve is opened in response to a second control channel error signal so as to pneumatically shunt the aforementioned diaphragm causing the displacement rod and diaphragm to be repositioned more rapidly, thus increasing the brake pressure at a more rapid rate, which rate is determined by the size of the bypass valve.

3 Claims, 5 Drawing Figures

HYDRAULIC PRESSURE MODULATOR FOR USE IN ADAPTIVE BRAKING SYSTEMS

This application is a division of our copending application Ser. No. 867,840 filed Oct. 20, 1969 now U. S. Pat. No. 3,669,403, which was a division of our application Ser. No. 712,672, filed Mar. 13, 1968, now U.S. Pat. No. 3,494,671.

BACKGROUND OF THE INVENTION

The wheel braking pressure which can be exerted by a motor vehicle operator is sufficient to cause the wheels to lock with resultant increase in stopping distance and reduced lateral vehicle stability. This is especially apparent when driving on low frictional coefficient surfaces. However, it is possible to optimize the braking characteristics of a wheeled vehicle under any tire-road interface condition by providing the vehicle with an adaptive braking system which will modulate the braking pressure to a pressure which maximizes the frictional force at the tire-road interface.

Mu-slip curves, which are plots of the tire-road interface frictional force versus wheel slip, are well known in the art. These curves, which are empirically obtained, show a maximum mu in the range of 15 to 25% slip. Height and sharpness of this maximum mu point is generally dependent upon the nature of the tire-road interface and its condition. An adaptive braking system which permits only that amount of brake pressure to be applied which causes a wheel slip corresponding to the maximum mu point on the mu-slip curve for the conditions then encountered provides optimum braking for the vehicle being controlled. In certain known adaptive braking systems a vacuum actuated hydraulic pressure modulator is interposed in the hydraulic line between the vehicle master cylinder and the wheel brake cylinders and is used to modulate the brake pressure in accordance with control or error signals received from a control channel operating in response to certain dynamic states of the wheel being controlled such as the wheel attaining some predetermined degree of deceleration. When the control wheel attained the aforementioned dynamic state, the control channel operated to cause the pressure modulator to isolate the wheel cylinders from the master cylinder and additionally to rapidly attenuate the pressure at the wheel cylinder, thus allowing the wheel to accelerate. When the controlled wheel attained a second dynamic state, the error signal was extinguished and the pressure modulator slowly restored pressure to the wheel cylinder, thus slowly reapplying the brakes to the vehicle.

SUMMARY OF THE INVENTION

It is advantageous in optimizing the braking characteristics of a vehicle to provide the vehicle with an adaptive braking system to attenuate the braking pressure when a slip condition is initially encountered and additionally to reapply the braking pressure at differing rates of reapplication in response to various resultant wheel dynamic states. It is thus one object of this invention to provide an adaptive braking system for use on wheeled vehicles which will cause a braked vehicle to come to a controlled stop by modulating the hydraulic brake fluid pressure to maintain a wheel slip which will maximize within practical limits the force which is developed between the tire and road surface under conditions then encountered.

Another object of this invention is to provide an antiskid braking system which is compatible with conventional hydraulic braking systems and can be installed in the vehicle as an adjunct thereto, performing its operational functions therethrough. The adaptive braking system and pressure modulator which is the subject of this invention utilizes one essentially independent channel for each wheel or group of wheels which it is desired to control, the channels being connected into the hydraulic fluid line of a conventional braking system in the vehicle electrical power supply, thus providing compatibility with conventional braking systems.

Briefly, this new vacuum actuated pressure modulator operates as follows. A sealed modulator body interior portion is divided into first and second expansible chambers by a flexible diaphragm normally spring biased to a first position to expand the first chamber and to contract with the second chamber. The first chamber communicates directly with a vacuum source. A small leak provided across the diaphragm normally allows pneumatic pressure on either side of the diaphragm to be equalized. A displacement rod, cooperating with the diaphragm, when in a first position opens a ball valve allowing free communication between valve first and second ports. The valve first port is connected to the vehicle master cylinder output port and the valve second port is connected to the wheel brake cylinder input ports. In response to a first error signal generated by an associated adaptive braking system control channel, a solenoid valve is opened, allowing atmospheric air to enter directly into the second expansible chamber thus forcing the diaphragm to move against the spring bias towards a second position whereby the second chamber is expanded. The cooperating displacement rod moves with the diaphragm to close the ball valve thus isolating the wheel cylinders from the master cylinder and additionally displaces hydraulic fluid from the wheel brake cylinders thus attenuating the brake pressure therein. When the error signal is extinguished, thus closing the solenoid valve so that atmospheric air is no longer introduced into the second expansible chamber, the air therein will leak across the diaphragm through the aforementioned small leak thus permitting the diaphragm and cooperating displacement rod to be returned at a relatively slow rate towards the first position thus forcing hydraulic fluid back into the wheel brake cylinders to restore the braking pressure. If brake pressure is not restored rapidly enough as determined by the adaptive braking system control channel, a second error signal is generated to open a second solenoid valve which shunts across the diaphragm thus permitting air in the second chamber to move more rapidly into the first chamber thus causing the diaphragm and displacement rod to move more rapidly towards the first position to more rapidly restore braking pressure.

DESCRIPTION OF THE PREFERRED EMBODIMENT

Figure 1:
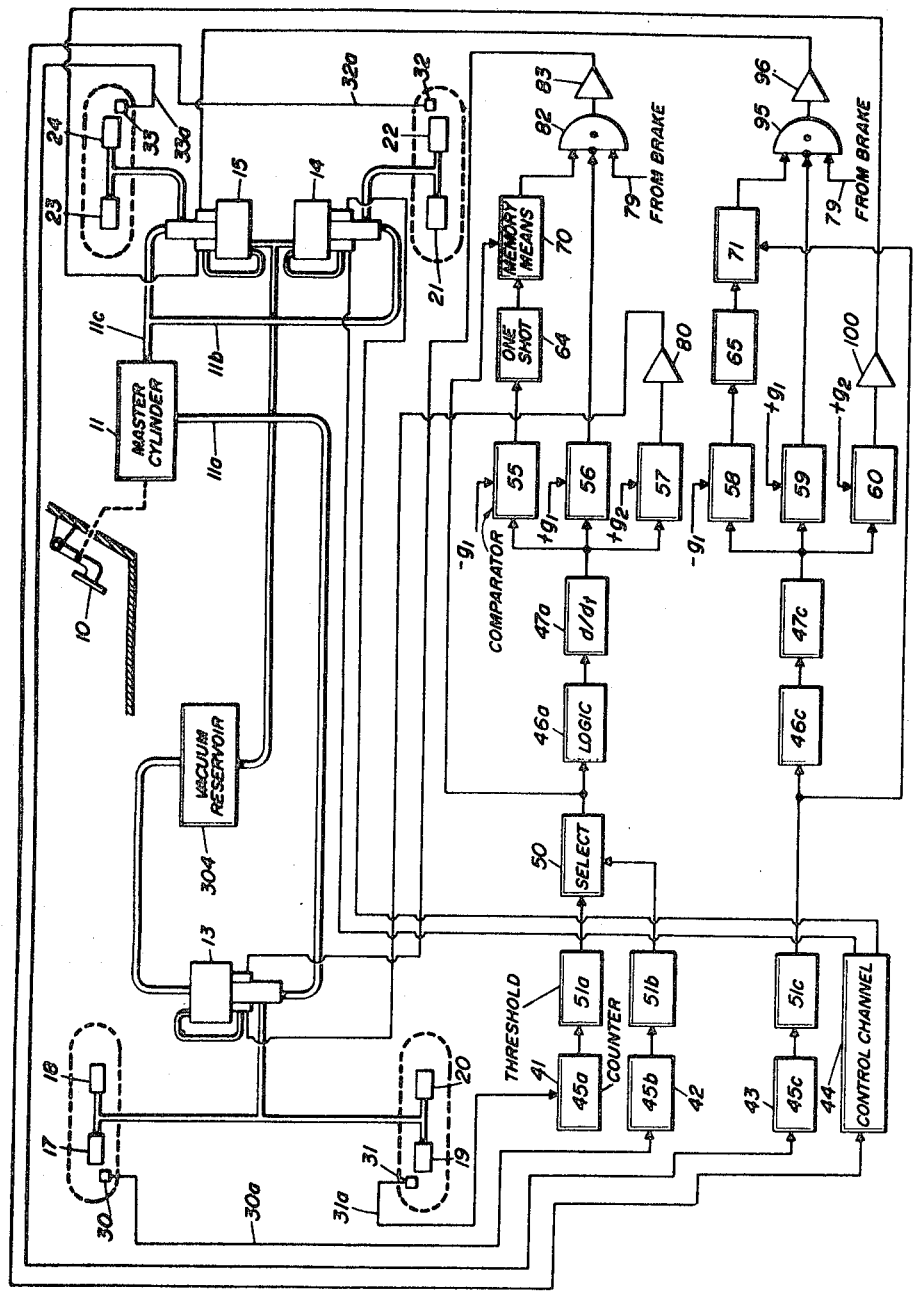
FIG. 1 is a functional block diagram of an adaptive braking system installed in a passenger motor vehicle having sensors on each wheel and pressure modulators controlling each front wheel individually and the rear axle.

In the description of FIG. 1 it should be understood that control channel 44 is identical to control channel 43 and the description of the structure and operation of channel 43 is applicable to the structure and operation of channel 44, the only exception being that channel 43 controls the left front wheel of the vehicle shown while channel 44 controls the right front wheel.

In FIG. 1 there is shown one form of adaptive braking system control channel for use with the invention vacuum actuated hydraulic pressure modulator. It should be understood that various other types of control channel might also be used, it only being required that a control channel generate: a first error signal in response to an attained dynamic wheel state such as the wheel attaining a predetermined level of acceleration at which it is desired to reduce braking pressure; a second error signal when it is desired to restore braking pressure at a relatively slow rate; and a third error signal when it is desired to restore braking pressure at a relatively rapid rate. Referring now to FIG. 1, a brake pedal 10 may be depressed to pressurize the hydraulic fluid in master cylinder 11 which thereby supplies a fluid pressure in hydraulic lines 11a, 11b and 11c in the conventional manner. Each hydraulic line has interposed in its path a vacuum actuated pressure modulator 13, 14 or 15 which, when the adaptive braking device is inoperative, allows hydraulic pressure to pass therethrough unimpeded, as will be later explained, to wheel brake cylinders 17 to 24. Wheel speed sensors 30 to 33, one mounted on and sensing the rotational velocity of each wheel, generate pulses linearly related to wheel velocity, which pulses are applied over electrical lines 30a, 31a, 32a and 33a to control channels 42, 41, 44 and 43, respectively. The pulses are converted to a d.c. voltage level in counters 45a, 45b and 45c. This d.c. voltage level which is proportional to wheel velocity can pass through threshold 51a, 51b or 51c only if the velocity of the sensed wheel is above a set threshold. In the case of channel 43 (and hence channel 44) the velocity signal is analyzed by logic circuitry 46c to recognize the locked wheel or the stopped vehicle condition. This logic function is performed in channels 41 and 42 by logic circuitry 46a after a velocity signal has been selected by select circuitry 50 which can be designed to select either the higner or lower velocity signal.

Any change in the d.c. level, indicating a change in wheel velocity, is processed by different stores 47a and 47c to produce a signal correlative to wheel acceleration, which signal in channel 43 is compared with predetermined reference voltage levels in comparators 58 to 60 while the acceleration signal developed in the hybrid channel 41 and 42 is applied to comparators 55, 56 and 57. It can thus be seen that channels 41 and 42 are combined by gate 50 into a single channel which further processes only the selected velocity signal Channels 43 and 44, however, are independent from one another and are independent from the combined channels 41 and 42. Additionally, except for the combining of channels 41 and 42 by gate 50, the channels are essentially identical to one another, thus the following discussion, for simplicity, will be restricted to a description of channel 43 with the understanding that the description applies equally to the other channels of the system.

As in the case of channels 41 and 42, the output of differentiator 47c is a voltage signal correlative to wheel acceleration (and deceleration) of the wheel controlled by channel 43. This acceleration signal is applied to comparators 58, 59 and 60. When the vehicle is braked, the wheels immediately start to slow down thereby producing an output from differentiator 47c corresponding to the wheel deceleration. Comparator 58 has applied thereto a reference voltage level corresponding to the predetermined value of wheel deceleration $(-g_1)$. If wheel deceleration should exceed this reference level an error signal is generated by comparator 58 which triggers one shot 65, suitably a monostable multivibrator. The leading edge of the one shot output pulse enables memory means 71, which suitably includes a low loss capacitor, to memorize a voltage corresponding to a predetermined percentage of present wheel speed. If, at any time during the period of the one shot output pulse the wheel velocity signal decreases below the memorized voltage, memory means 71 generates a latching signal which is applied to latching gate 95. Gate 95 also receives an inhibit signal from comparator 59 when the acceleration exceeds a $+g_1$ acceleration reference level so that in the presence of a comparator 58 output, which indicates that wheel deceleration exceeds the $-g_1$ reference level, the lack of an output from comparator 59, which indicates that wheel acceleration has not exceeded the $+g_1$ reference level and a signal over line 79 which indicates that the brakes have been applied, gate 95 is latched open and a signal passes therethrough to amplifier 96 and vacuum modulator 15. The effect of this signal on modulator 15 will be explained later.

Figure 4:
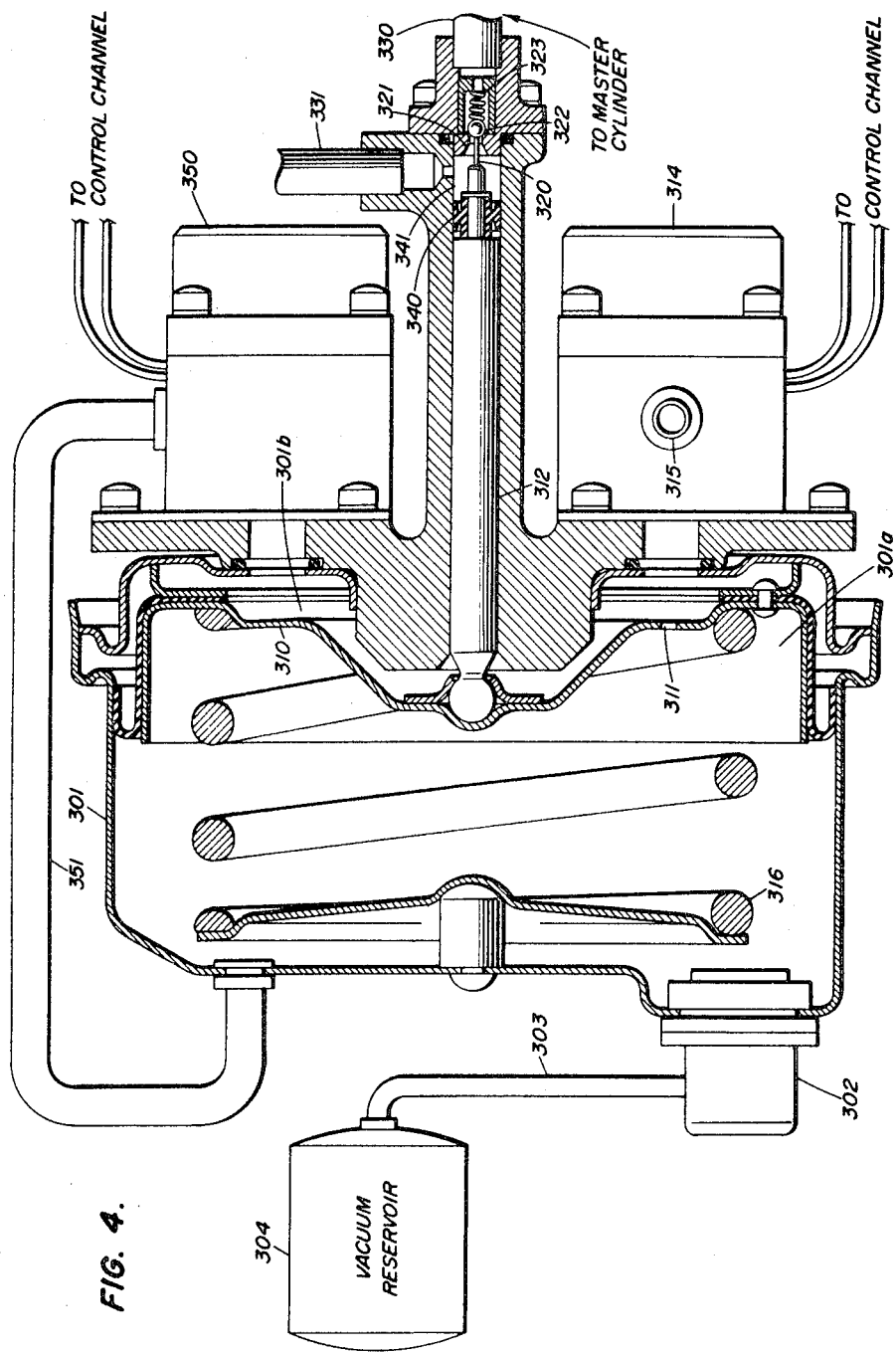
FIG. 4 is a cut-away view of a pressure modulator made in accordance with the teachings of this invention.

Vacuum actuated pressure modulators 13, 14 and 15 are identical except for the fact that modulator 13 controls the brake pressure supplied to both rear wheels, whereas modulators 14 and 15 control the brake pressure supplied to the right front and left front wheels respectively. Refer now to the pressure modulator shown in greater detail in FIG. 4. A rubber diaphragm 310 divides modulator body 301 into two chambers, 301a and 301b. Modulator chamber 301a communicates through check valve 302 and vacuum conduit 303 with a vacuum reservoir 304. A solenoid valve 314 having a winding connected to receive the output of gate 95 via amplifier 96 (FIG. 1) operates when energized in response thereto to admit atmospheric air into modulator chamber 301b. Rubber diaphragm 310 is generally airtight except for orifice 311 which allows restricted pneumatic communication between chambers 301a and 301b. Thus, with valve 314 deenergized, no atmospheric air can enter the modulator so that the vacuum on each side of diaphragm 310 is balanced and spring 316 biases diaphragm 310 to the right. When the solenoid valve opens in response to a gate 95 output, air is admitted into chamber 301b and thence through orifice 311 into chamber 301a and finally into vacuum reservoir 304. However, orifice 311 is very much smaller than the effective air passage through solenoid valve 314 so that air pressure builds up in chamber 301b thus forcing diaphragm 310 to the left against its biasing spring. A displacement rod 312 connects at one end to the diaphragm and terminates at its opposite end in axially located pin 320 which, extending through valve seat 321, abuts valve ball 322. When diaphragm 310 is all the way to the right, corresponding to gate 95 being closed, valve ball 322 is lifted from valve seat 321 allowing free communication of hydraulic brake fluid from the master cylinder through valve ports 330 and 331 to the wheel cylinders. As the diaphragm moves slightly to the left carrying with it displacement rod 312, as would occur when gate 95 (FIG. 1) opens initially, abutting pin 320 also moves to the left, allowing spring 323 to force ball 322 against seat 321, thereby isolating the master cylinder from the wheel cylinders and trapping a pressurized fluid in the wheel cylinder. At the instant the wheel cylinders become isolated the brake fluid pressure therein will be equal to the brake fluid pressure developed in the master cylinder which, in the case of a panic stop, could be well above that pressure required to lock the wheels. Since, however, some finite time is required for the wheels to lock, at this instant the wheels have not yet attained the locked condition and additionally, diaphragm 310 continues to move to the left. This diaphragm movement carries displacement rod 312 and Vee packing gasket 340 also to the left. Expansible valve interior 341, whose left edge is defined by gasket 340, increases in volume causing the hydraulic fluid pressure trapped in the wheel cylinders to be thus attenuated. At maximum displacement of the diaphragm the volume of chamber 341 has increased to the point where the fluid pressure in the wheel cylinders has been substantially relieved and the braking on that wheel correspondingly released. This wheel is now accelerating.

Referring also to FIG. 1, as the wheel is now accelerating, the output of differentiator 47c changes from a deceleration to an acceleration signal so that comparator 58 no longer produces an output. It will, however, be remembered that gate 95 is latched open until the differentiator 47c output exceeds the $+g_1$ reference level, which event causes comparator 59 to generate a gate 95 inhibiting signal. Gate 95 will thus become unlatched and will close, deenergizing solenoid valve 314 thereby isolating the interior of the modulator body from the atmosphere. The atmospheric air entrapped in chamber 301b continues to leak through orifice 311. However, since solenoid 314 is closed, the air in chamber 301b is not being replenished so that the diaphragm will now move slowly back towards the right carrying with it displacement rod 312. The rate at which the diaphragm moves towards the right is determined by the leakage rate between chambers 301b and 301a. This is set by the size of the orifice which is quite small. The hydraulic fluid which had previously been displaced from the wheel cylinders, into chambers 314 is slowly forced back into the wheel cylinders, thus slowly increasing the brake pressure on the wheel. It will be noted that the acceleration signal generated by differentiator 47c is also applied to comparator 60, wherein it is compared to another acceleration level $+g_2$ which is higher than the reference acceleration level $+g_1$. If, in spite of the increasing brake pressure on the wheel, the wheel should continue to accelerate so that reference acceleration level $+g_2$ is exceeded, comparator 60 will generate an error signal which is amplified by amplifier 100 and applied to a solenoid bypass valve 350 which, although normally closed, in response to this amplified error signal opens so as to shunt orifice 311. The air entrapped in chamber 301b can thus move more rapidly into chamber 301a, allowing diaphragm 310 and displacement rod 312 to move more rapidly to the right thus causing the brake pressure at the wheel cylinder to increase more rapidly. As the wheel cylinder brake pressure increases, the wheel accelerates more slowly so that at first the $+g_2$ reference level is no longer exceeded. The error signal generated by comparator 60 is thus extinguished so that the bypass valve closes and diaphragm 310 resumes its slow movement to the right at the slow rate determined by orifice 311 so that brake pressure build up returns to the slow mode. As wheel acceleration decreases still further the $+g_1$ acceleration level is no longer exceeded so that the comparator 59 error signal is also extinguished thus extinguishing the inhibit signal on gate 95. This does not effect the slow build up of brake pressure but only allows gate 95 to be ready to receive the latching signal if the wheel decelerates below the $-g_1$ reference level and the cycle is repeated.

Figure 3:
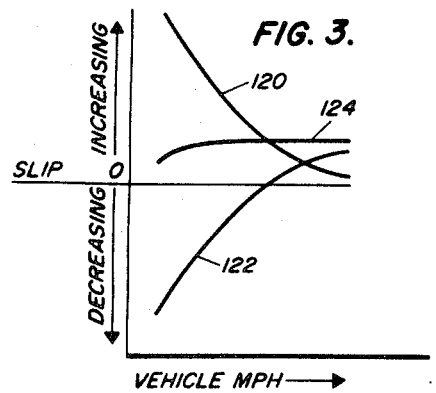
FIG. 3 is a plot of minimum slip values versus vehicle speed at memorization time.
Figure 2:
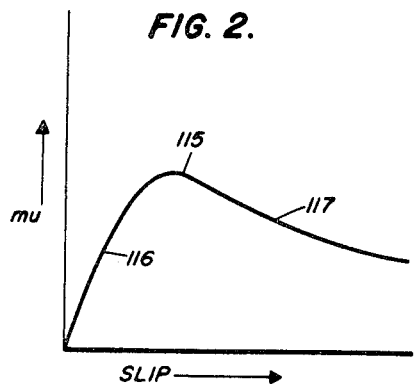
FIG. 2 is a typical mu-slip curve.

Referring now to FIG. 2, a typical mu-slip curve is seen. Mu is the frictional force developed at the tire-road interface and at automotive speeds is the major force tending to slow the vehicle. In order to optimize the braking characteristics of a vehicle equipped with an adaptive braking system, it is necessary that the mu developed at each wheel be maximized, that is, that the frictional force developed between the tire and the road surface be a maximum. Slip is the difference between vehicle velocity and wheel velocity where the wheel velocity is equal to its angular velocity times its radius. Slip is expressed mathematically at $1 - (rw/V)$, where $r$ = radius of the wheel; $w$ = rotational velocity of the wheel; and $V$ = vehicle speed. It has been found empirically that the maximum point 115 on a typical mu-slip curve for all investigated conditions of tire and road interface occurs between .15 and .30 slip. It has also been discovered through experimentation that under maximum mu conditions the highest stopping rate for a braked automobile that could be obtained was in the neighborhood of $-1g$. To insure that the anti-skid system will operate about the peak of the mu-slip curve the aforementioned $-g_1$ reference level has been set at a voltage corresponding to $1.8g$'s deceleration. Since, at the time of wheel speed memorization the wheel must have obtained a $1.8g$ deceleration level while, as aforementioned, the maximum vehicle deceleration level is in the neighborhood of $1g$, at the time of memorization there must be some wheel slip existing. Curve 120 of FIG. 3 shows the minimum value of slip with respect to the vehicle speed at the memorization time resulting from this difference in g level. It will be remembered that when the wheel attains a $-g_1$ level the wheel speed is memorized for a predetermined time during which the wheel speed is continuously monitored to determine whether it has dropped by a predetermined percentage. In an anti-skid system designed for a standard passenger vehicle in which the $-g_1$ reference level is set at $1.8g$ a decrease in car speed of 15 percent during a memorization period of 108 milliseconds has produced an anti-skid system having excellent braking capabilities.

Referring again to FIG. 3, curve 122 is a plot of minimum possible wheel slip versus vehicle speed if at the end of the 180 millisecond memorization period the wheel speed had decreased by exactly 15 percent. The minimum possible wheel slip at the time brake pressure is reduced will thus be a combination of the slips shown in curves 120 and 122, which is shown as curve 124. This curve shows that the minimum possible slip under the conditions stated is practically constant at all vehicle speeds and equal to approximately .15 slip.

Figure 5:
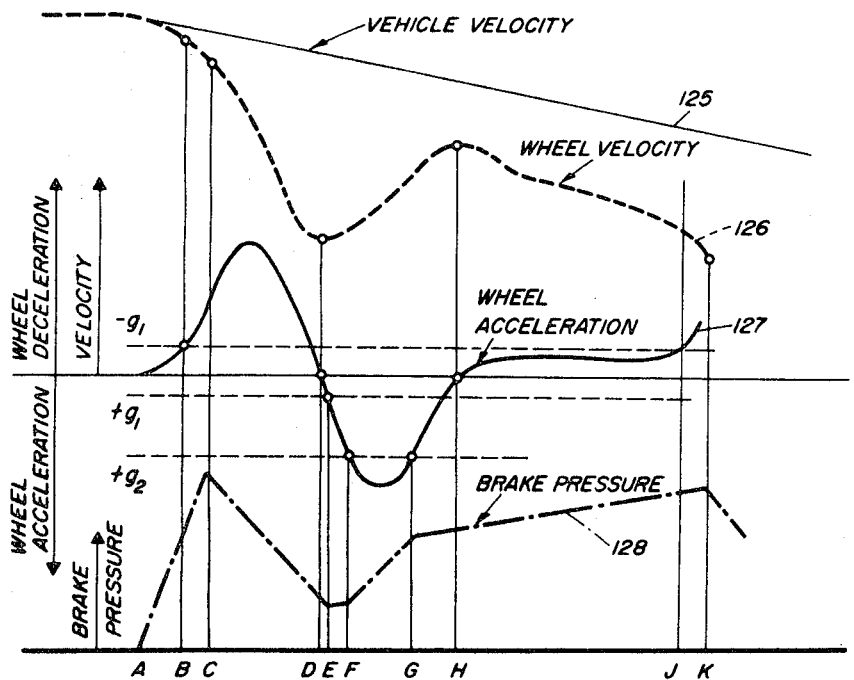
FIG. 5 is a plot of various vehicle parameters versus time during a braked stop controlled by an adaptive braking system of this invention.

Referring now also to FIG. 5, where curve 125 is a plot of vehicle speed versus time, curve 126 is a plot of wheel speed versus time, curve 127 is a plot of wheel acceleration versus time and curve 128 is a plot of brake pressure versus time. At a time prior to A the vehicle is unbraked so that the vehicle and wheel speeds are in synchronization. At time A the vehicle is braked so that the brake pressure rises rapidly and the wheel decelerates producing decreasing vehicle and wheel speeds. At time B the wheel decelerates past the $-g_1$ level and the wheel speed is memorized. At time C, which is less than 180 milliseconds after time B, wheel speed has decreased to 85 percent of the memorized speed so that brake pressure is now reduced. Due to inherent time lags in the hydraulic braking system the wheel will continue to decelerate for some finite time, attaining a maximum deceleration somewhere between time C and time D, the latter time being at the point of zero wheel acceleration. During this time, of course, the wheel would continue to slow down at a higher rate than the vehicle slow down rate so that wheel slip continues to increase. It can now be assured that the wheel has passed over the hump 115 of the mu-slip curve shown on FIG. 2 and is operating along the portion of the curve 117. Wheel speed, of course, hits a minimum point at time D and thereafter as the wheel now is accelerating wheel speed is increasing toward vehicle speed. At time E wheel acceleration becomes equal to the $+g_1$ acceleration level so that once again brake pressure is slowly increased. This slow increase in brake pressure plus the aforementioned inherent lag in the hydraulic braking system allows wheel acceleration to continue to increase until at time F the wheel has accelerated to the $+g_2$ acceleration level. It will be remembered that at this time the pressure modulator bypass valve opens thereby allowing the brake pressure to increase rapidly as can be seen on curve 128 between time F and time G. During this time wheel acceleration has continued to increase past the $+g_2$ acceleration level, finally reversing and returning below the $+g_2$ acceleration level time G, thus closing the bypass valve so that once again brake pressure is increased at a slow rate due solely to the leak across the vacuum modulator diaphragm. At time H the wheel once more passes through the zero acceleration level and again begins to decelerate. During the time that the wheel has been accelerating, that is time D to time H, the slip as shown in FIG. 2 has been moving from the 117 portion of the mu-slip curve back over the hump 115 and into the 116 portion of the curve. At time H the slip is in close proximity to hump 115 but on the portion of the curve 116. Since the wheel is now in the $-g$ region slip again will increase slowly under the influence of the slowly increasing brake pressure and once again approach hump 115. At a time just prior to J wheel slip reaches hump 115 on the mu-slip curve. A further increase in brake pressure unbalances the braking torque on the wheel for the existing road-tire interface conditions and the wheel proceeds rapidly toward lock-up as can be seen in the sharp rise in wheel deceleration at that time. At time J wheel deceleration exceeds the $-g_1$ level so that the cycle is once again repeated.

Having described the above preferred embodiment of our invention, we claim:

1. In an anti-skid system for wheeled vehicles including a low pressure sink and a high pressure fluid source wherein a braking force is hydraulically applied with hydraulic fluid from a master cylinder to a wheel cylinder, means for automatically controlling said braking force in response to control signals comprising a hydraulic fluid pressure modulator interposed between said master cylinder and said wheel cylinder comprising:

a modulator body having a pneumatically sealed interior;

flexible diaphragm means for dividing said sealed interior into first and second expansible chambers;

means for connecting said second chamber to said low pressure sink;

first valve means actuated by a first of said control signals for connecting said first chamber to said pressure fluid source whereby said first chamber is expanded;

second valve means including first and second ports and responsive to the position of said diaphragm means for controlling communication between said first and second ports;

means connecting said first port to said master cylinder;

means connecting said second port to said wheel cylinder;

spring means for biasing said diaphragm towards said first chamber; and, additional means independently actuated by a second of said control signals for providing substantially free communication between said first and second chambers when open and for providing relatively restricted communication between said first and second chambers when said third valve means is closed.

2. An anti-skid system as recited in claim 1, wherein said pressure fluid is atmospheric air and said low pressure sink is a vacuum source.

3. An anti-skid system as recited in claim 2, wherein:

said first valve means comprises a solenoid valve responsive to electrical signals and connected to admit air into said first chamber when open; and, said third valve means comprises a solenoid valve responsive to electrical signals and connected to allow relatively free pneumatic communication between said first and second chambers when opened.

* * * * *